(12) United States Patent
Lakshminarasimha et al.

(10) Patent No.: US 7,321,561 B2
(45) Date of Patent: Jan. 22, 2008

(54) VERIFICATION OF CONNECTIONS BETWEEN DEVICES IN A NETWORK

(75) Inventors: Narendra Lakshminarasimha, Sunnyvale, CA (US); David Andrew Graves, Monte Sereno, CA (US); Pallavi Gadepalli, Santa Clara, CA (US); Vikram Ramesh, Cupertino, CA (US); Margaret Mary Bertsch, Nashville, TN (US); George Tomlinson, Livermore, CA (US); Mark Pearson, Applegate, CA (US); Ted Nguyen, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 946 days.

(21) Appl. No.: 10/607,731

(22) Filed: Jun. 27, 2003

(65) Prior Publication Data

US 2004/0264382 A1    Dec. 30, 2004

(51) Int. Cl.
*G06F 11/00* (2006.01)
*H04L 12/56* (2006.01)

(52) U.S. Cl. .............. 370/252; 370/392; 370/395.21; 370/401

(58) Field of Classification Search .............. 370/252, 370/254, 389, 401, 392, 395.21
See application file for complete search history.

(56) References Cited

U.S. PATENT DOCUMENTS

| 6,697,338 B1* | 2/2004 | Breitbart et al. ............ 370/254 |
| 2003/0009699 A1* | 1/2003 | Gupta et al. ................ 713/201 |

* cited by examiner

*Primary Examiner*—Afsar Qureshi

(57) ABSTRACT

Methods and systems for verifying that devices in a network are properly connected physically are described. A listing is received from a device in the network. The listing identifies other devices coupled to the device and also identifies which communication port of the device each of the other devices is coupled to. The listing is compared against reference information representing the design of the network. Discrepancies between the listing and the reference information are identified.

27 Claims, 3 Drawing Sheets

US 7,321,561 B2

VERIFICATION OF CONNECTIONS BETWEEN DEVICES IN A NETWORK

TECHNICAL FIELD

Embodiments of the present invention relate to networks (e.g., local area networks). More specifically, embodiments of the present invention relate to networks used as utility data centers and server farms, for example.

BACKGROUND ART

Devices such as computer systems, routers, switches, load balancers, firewalls, and the like, are commonly linked to each other in networks. These networks are configured in different ways depending on implementation-specific details such as the hardware used and the physical location of the equipment, and also depending on the particular objectives of the network. One common type of network configuration includes a number of "virtual" networks, commonly known as virtual local area networks (VLANs). A VLAN is, in essence, a logical segmentation of a physical local area network (LAN).

An advantage of VLANs is that the devices associated with a particular virtual network do not need to all be in the same physical location, yet all will appear to be on the same LAN. Prior Art FIG. 1 is a block diagram of a portion of a LAN 10 that includes a number of racks (20, 21 and 22) of computer systems (30-38) and a hierarchy of switches (11-16). Each of the computer systems 30-38 is physically wired to a respective switch (14, 15 or 16), which are each physically wired to switches 12 and 13, which in turn are physically wired to switch 11. By routing signals through the various switches, computer systems in different racks or within the same rack can communicate with each other, within certain constraints that will be explained. In addition, a signal from a remote device (not shown) can also be routed through the various switches so that the remote device can communicate with any of the devices in LAN 10, within certain constraints as well.

In the simplified example of Prior Art FIG. 1, LAN 10 is logically segmented into a VLAN 1 and a VLAN 2. VLAN 1 includes computer systems 30 and 37, and VLAN 2 includes computer systems 31 and 36. Should computer system 30 need to communicate with computer system 37, for example, a signal from computer system 30 can be routed through switch 14 to switch 16 and on to computer system 37.

For reasons such as security or privacy, communication between VLANs may not be permitted. In LAN 10, access to a particular VLAN is controlled by the switches 11-16. For example, switch 16 can be configured to forward a message from computer system 30 (VLAN 1) to computer system 37 (VLAN 1) but to not forward a message from computer system 30 (VLAN 1) to computer system 36 (VLAN 2). In a similar manner, communication from a remote device can be controlled so that the remote device can only communicate with certain devices in LAN 10. Therefore, even though VLANs can share resources such as switches, VLANs can be prevented from sharing traffic and information.

Another advantage of VLANs is that the management and cabling of groups of devices are simplified, particularly when the allocation of resources within the LAN is changed. For instance, in the simplified example of Prior Art FIG. 1, VLAN 1 may be used by one organization and VLAN 2 by another. The first organization may need more resources, while the resources of the other organization may be under-utilized. To resolve this, one of the computer systems in VLAN 2 can be reallocated to VLAN 1. This is accomplished by reconfiguring the appropriate switches instead of rewiring the LAN.

Thus, management and allocation of resources within and across VLANs are predicated on correct cabling between devices in the LAN. While every effort can be made to ensure that the network is wired correctly the first time, mistakes can still be made. For example, as a network is wired, a technician may attach a cable to a particular port (socket) of a switch, but incorrectly record the port (socket) number in a network map. Similarly, although a network map may instruct a technician to attach a cable to a particular port, the technician may inadvertently attach the cable to an incorrect port. Therefore, it remains important to verify, after the network is set up, that the network is indeed set up correctly.

However, networks of devices are often large and complex, and so verifying that network cabling is correct can be difficult and costly. Some prior art procedures for verifying proper network cabling rely on manual procedures such as visually tracing each cable from its source device to its destination device. This is slow and costly, and in some cases is not a viable procedure, because large groups of cables are often bound together into bundles, making it difficult if not impossible to visually trace a particular cable as it disappears into a bundle.

Other prior art procedures utilize a "ping" command that is issued from a source device to a target device. If the ping command is successful, it can be presumed that the cable is properly connected. However, this approach is also slow and costly, in particular when used with networks that employ hundreds of devices and thousands of cables. Furthermore, if the ping command is not successful, it remains to be determined which end of the cable is connected incorrectly. Thus, both ends of the cable need to be checked.

For these and other reasons, a method and/or system that can verify that devices in a network are properly connected physically would be of value. Embodiments of the present invention provide this and other advantages.

DISCLOSURE OF THE INVENTION

Embodiments of the present invention pertain to methods and systems for verifying that devices in a network are properly connected physically. A listing is received from a device in the network. The listing identifies other devices coupled to the device and also identifies which communication port of the device each of the other devices is coupled to. The listing is compared against reference information representing the design of the network. Discrepancies between the listing and the reference information are identified.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
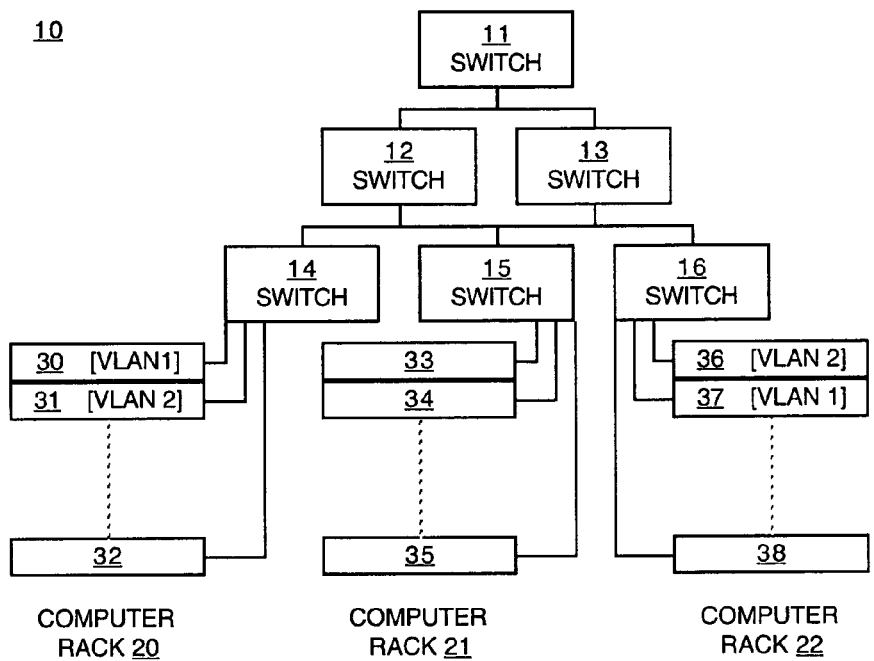
FIG. 1 is a block diagram of an exemplary local area network (LAN) including virtual local area networks.
Figure 2:
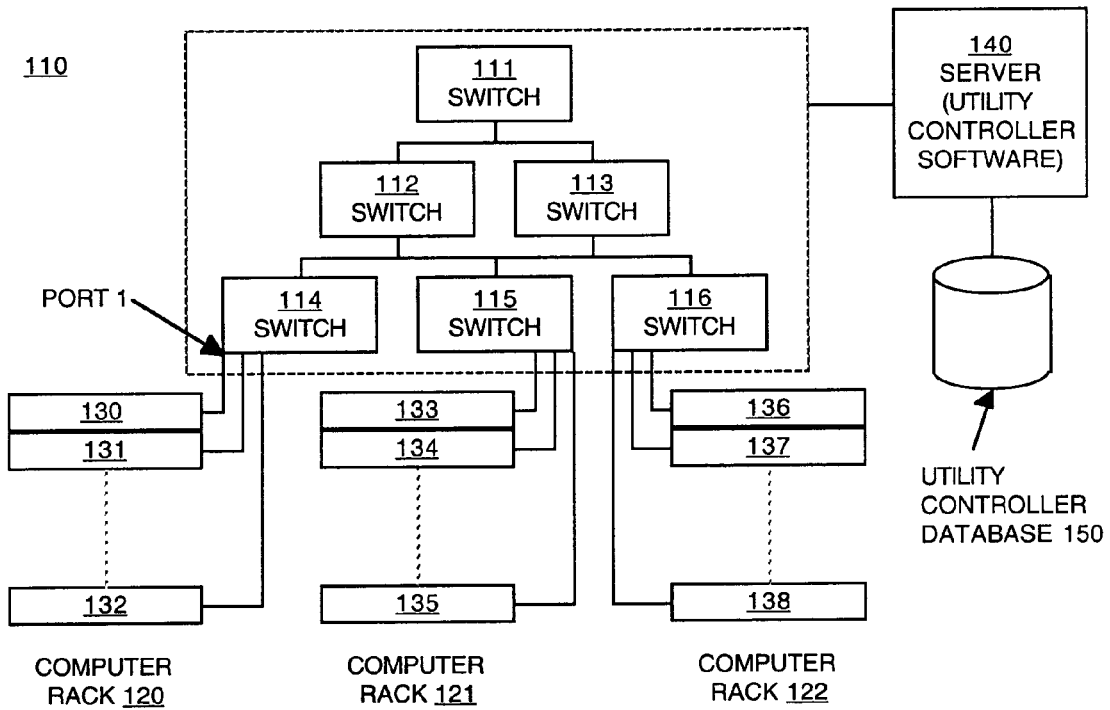
FIG. 2 is a block diagram of an exemplary LAN upon which embodiments of the present invention can be implemented.

FIG. 2 is a block diagram of an exemplary local area network (LAN) 110 upon which embodiments of the present invention can be implemented. It is appreciated that LAN 110 can include elements in addition to those shown (e.g., more racks, computers, switches and the like), and can also include other elements not shown or described herein. Furthermore, the blocks shown by FIG. 2 can be arranged differently than that illustrated, and can implement additional functions not described herein.

In general, LAN 110 utilizes a programmable infrastructure that enables the virtual connection of selected computing resources as well as the isolation of selected computing resources, thereby ensuring the security and segregation of computing resources at the lowest infrastructure level. The pool of computing resources in the LAN 110 includes pre-wired, pre-integrated, and pre-tested physical resources. The computing resources in the LAN 110 can be dynamically and logically reconfigured into various virtual local area networks (VLANs). A number of such VLANs can be created and managed by the utility controller software.

Figure 3:
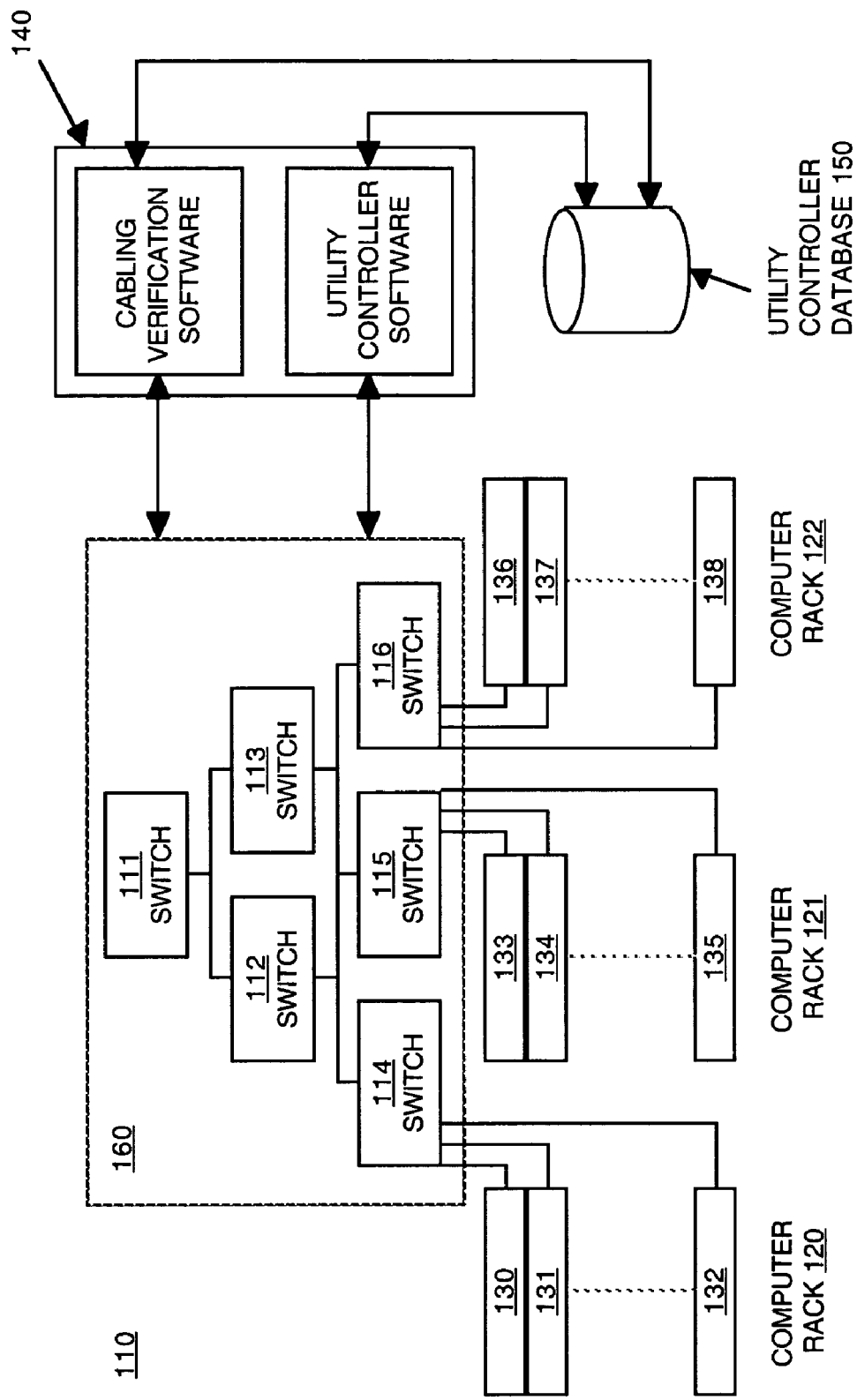
FIG. 3 is a block diagram of an exemplary LAN incorporating a cabling verifier according to one embodiment of the present invention.
Figure 4:
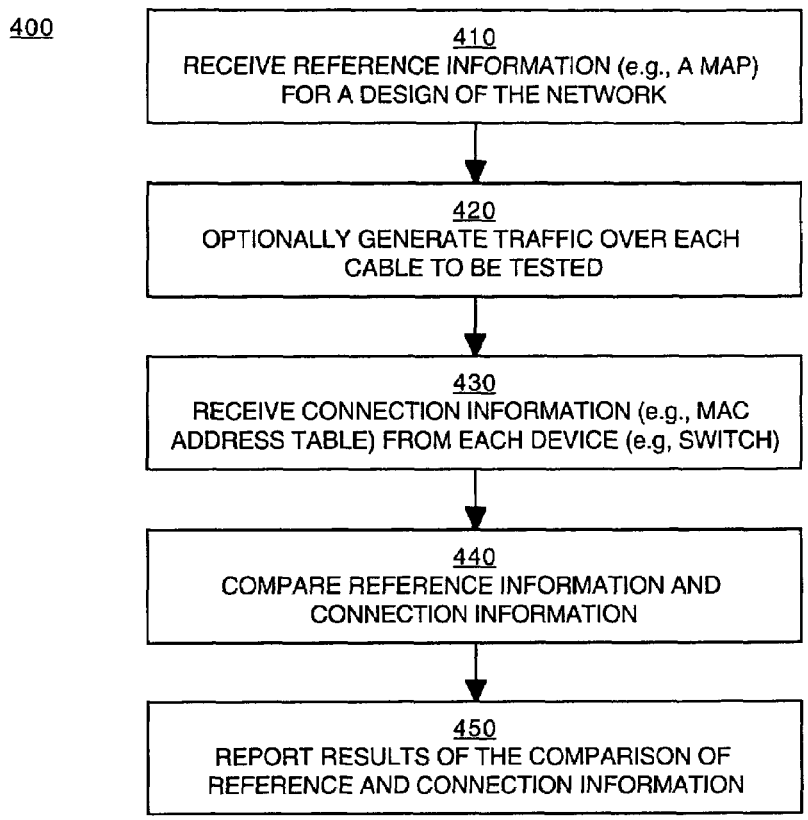
FIG. 4 is a flowchart of a process for verifying that devices are properly connected according to one embodiment of the present invention.
Figure 5:
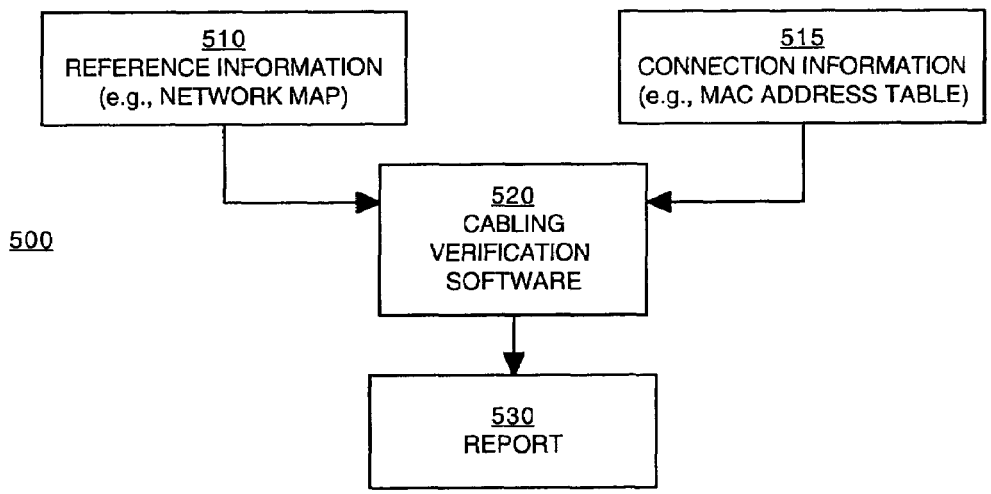
FIG. 5 is a data flow diagram for cabling verification elements according to one embodiment of the present invention.

Proper wiring of LAN 110 is automatically verified according to the techniques described herein (refer to FIGS. 3, 4 and 5).

In the present embodiment, LAN 110 of FIG. 2 includes a number of switches 111 through 116, and a number of computers 130-138 that are couplable to the switches 111-116. Typically, the computers 130-138 are physically located in computer racks 120, 121 and 122, although this may not always be the case. In this embodiment, the switches and computer systems are interconnected using cables or the like.

In the present embodiment, the switches 111-116 can be programmed or configured such that LAN 110 is logically separated into a number of VLANs. The programming or configuring of these switches can be changed, thereby changing the resources allocated to the various VLANs. For example, by changing the configuration of switch 114, computer system 130 can be "moved" from one VLAN to another. The allocation and reallocation of resources between VLANs can be achieved without changing the physical wiring between devices.

In addition to computer systems and switches, LAN 110 can include other types of devices such as, but not limited to, routers, load balancers, firewalls, and hubs. These other types of devices may also be programmable or configurable. As will be seen, the features of the present invention can be used with these types of devices as well as with switches. That is, although described primarily in the context of switches, the features of the present invention are not so limited.

In the present embodiment, LAN 110 includes or is coupled to a server 140. Server 140 executes utility controller software for managing the resources in LAN 110, and as such server 140 can also be referred to as a utility controller. For example, the utility controller software executed by server 140 enables the deployment, allocation, and management of VLANs. The utility controller software monitors deployed VLANs, and automatically reallocates resources when there is a reason to do so.

In the present embodiment, server 140 includes a utility controller database 150; alternatively, utility controller database 150 can reside in a separate storage device that is coupled to the server 140. Utility controller database 150 includes information pertaining to the various resources in LAN 110. In one embodiment, utility controller database 150 includes information that is regarded as a correct and accurate representation of the LAN 110 as it is designed and as it should be implemented.

The utility controller database 150 is also referred to herein as "reference information," "design information," or "design basis information." As resources in LAN 110 are reallocated, the information in utility controller database 150 is also changed. Changes to the utility controller database 150 can also be used to drive changes to the allocation of resources in LAN 110.

Utility controller database 150 includes information such as the types of devices in LAN 110 and a representation of each VLAN. Other information included in utility controller database 150 includes, but is not limited to: the network or MAC (media access control) address for the resources of LAN 110, including the MAC addresses of each network interface card (NIC) used by those resources; the port numbers of resources such as switches; the VLAN identifiers associated with each of the port numbers; the socket identifier for each cable connected to each of the resources of LAN 110; manufacturer and model numbers; and serial numbers.

In one embodiment, utility controller database 150 is embodied as a computer-readable network map. It is understood that such a map need not exist in a form conventionally associated with human-readable maps. It is also appreciated that a computer-readable network map can be synthesized on-the-fly from the information stored in utility controller database 150.

FIG. 3 is a block diagram of an exemplary LAN 110 incorporating a cabling verifier according to one embodiment of the present invention. At least one of the functions of the cabling verifier is to automatically verify that the actual (as built) connections between devices in LAN 110 is correct relative to the reference or design information in utility controller database 150. It is appreciated that the cabling verifier can be used to update the information in utility controller database 150 if the presumption is instead that the devices are correctly connected. In general, the cabling verifier can be used to ensure that information describing the actual connections between devices and the information in the utility controller database 150 are synchronized (e.g., they match). One set of information is known to be correct. By synchronizing the two sets of information, the other set of information is also made correct.

In the example of FIG. 3, the cabling verifier is embodied as cabling verification software residing on server 140. The cabling verification software and the utility controller software can reside on the same or on different devices. The cabling verification software and the utility controller software can also reside in the same or in different software packages or applications. What is of significance is that, in one embodiment, the cabling verification software functions independently of the utility controller software, allowing independent verification of the correctness of the connections between network devices.

In the present embodiment, the cabling verifier (e.g., the cabling verification software) is coupled to the utility controller database 150. As described above, utility controller database 150 includes reference or design information for LAN 110. The cabling verifier is also coupled to the switching fabric 160 of LAN 110 (e.g., switches 111-116). In general, the cabling verifier has access to "connection information" for each of the switches 111-116.

As used herein, "connection information" refers to information that describes how devices are actually connected. For example, connection information can include information such as the MAC address table(s) resident on each of the switches 111-116. Connection information is embodied as an entity separate from the reference information mentioned above. In other words, the reference information describes the network as it should be built, or as it is believed to be built, while the connection information describes the network as it actually is built and operates. Accordingly, connection information may also be referred to herein as "as-built information."

Thus, the cabling verifier has access to connection information (e.g., the MAC address tables or equivalent) resident on each of the switches 111-116. This can be accomplished by communicating with one of the switches that in turn communicates with each of the other switches, by directly communicating with each switch either in series or in parallel, or by some combination of these actions.

FIG. 4 is a flowchart 400 of a process for verifying that devices in a network are properly connected physically, according to one embodiment of the present invention. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed. All of, or a portion of, the methods described by flowchart 400 can be implemented using computer-readable and computer-executable instructions which reside, for example, in computer-usable media of a computer system or like device. In the present embodiment, flowchart 400 is implemented by the cabling verification software residing on server 140 of FIG. 3.

In step 410 of FIG. 4, in the present embodiment, reference information for the design of the VLAN is received by the cabling verification software of FIG. 3. In one embodiment, this information resides in utility controller database 150 of FIG. 3. in another embodiment, the reference information includes a computer-readable map of the VLAN, perhaps derived from the information in utility controller database 150.

In step 420 of FIG. 4, in one embodiment, an attempt is optionally made to generate traffic over each cable to be tested (verified). For example, a "ping" command can be sent from one device to another over a cable to be tested. Alternatively, a ping command can be sent from, for example, one server computer system to another on the network, perhaps traversing multiple intermediate devices and cables. When the ping command is successfully sent and a response is received, the physical integrity of the connection or connections between the source and destination devices can be verified.

The ping command, or a similar type of message, can also be used to refresh the MAC address tables in the source and destination devices. That is, there may be instances in which a MAC address table on a device is cleared, or perhaps an address in a MAC address table is deleted because a time-out condition is satisfied. By generating traffic between devices on a periodic basis using, for example, a ping command, the respective MAC address tables are relatively up-to-date and complete.

Use of a ping command or the like can increase the yield of cables that pass a verification test by increasing network traffic and thereby increasing the likelihood that the MAC address tables will contain the desired entries. There are other ways to increase the pass rate. One way is to test the cabling of a device that has just booted up, so that the initial network handshake between the device and a switch is still fresh in the MAC address table of the switch. Another way is to execute a program on the device that repeatedly generates at least one message over the network (different from a ping command).

Returning to FIG. 4, in step 430, the cabling verification software receives connection information (e.g., a MAC address table) from each of the devices (e.g., switches) in the network being tested. In one embodiment, the connection information is received in response to a command issued to the network devices by, for example, the cabling verifier (e.g., the cabling verification software of FIG. 3). The command can request that the information be provided immediately in response to the command. Alternatively, the command can include information that establishes a schedule or deadline for providing the connection information. Thus, connection information is received by the cabling verifier either in response to a command, or on a periodic basis regardless of whether another command is issued.

In another embodiment, the connection information is provided to the cabling verifier in response to some sort of triggering event. For example, if a new device is added to the network, or if for some reason some portion of the network is rewired, then the affected devices can automatically provide their connection information to the cabling verifier.

In yet another embodiment, the connection information resident on network devices is accessed and read by the cabling verifier. For example, instead of requesting the information and waiting for a response, the cabling verifier accesses a known memory location on a switch and reads the connection information that is stored there. Other methods for exchanging information between network devices and the cabling verification software can be used.

In step 440 of FIG. 4, the reference information of step 410 and the connection information of step 430 can be compared. Any discrepancies between the reference information and the connection information can be identified.

In one embodiment, the comparison of reference and connection information is accomplished as follows. As mentioned above, the MAC address table on a switch, for example, is accessed (e.g., read or retrieved). The MAC address table is searched for the MAC address (or addresses) used by each device that is expected to be connected to that switch. If a matching MAC address is found, the corresponding port number is read from the MAC address table and compared to the port number provided by the reference information (e.g., a network map).

In step 450, the results of the comparison between the reference and connection information are reported. As noted above, in one embodiment, the MAC address table on a switch is searched, and a matching MAC address may or may not be found.

If a matching MAC address is not found, then a message is generated that the cable connection cannot be verified at present. Note that the absence of a matching MAC address may be due to the lack of traffic over the cable, such that the MAC address table is not refreshed with the missing MAC address. Thus, corrective action can entail sending a ping command as described above, in an attempt to generate traffic and refresh the MAC address table.

If a matching MAC address is found, the port number read from the MAC address table is compared to the port number provided by the reference information.

If the port number read from the MAC address table does not match the port number from the reference information, a message is generated that includes information such as the identifiers for the source and destination devices (the devices attached to the cable being verified), the port numbers found, and the port numbers expected.

If the port number read from the MAC address table matches the port number from the reference information, a message can be generated indicating that the cable being verified has passed.

Thus, a report can be generated that identifies which cables are satisfactory, which cables did not pass verification, and which cables could not be verified at present. The report can include additional information, such as the identifiers for the devices attached to a cable that did not pass verification, thereby helping technicians locate and correct cabling errors. For example, the report can list an incorrectly placed cable, the identifiers for the device and port where the cable is currently inserted, and the identifiers of the device and port where the cable should be inserted, thereby enabling a technician to successfully move the cable from the incorrect location to the correct location.

The discussion above is based on the presumption that the reference information (e.g., utility controller database 150 of FIG. 3) is true and correct, and that any discrepancies between the reference and connection information are due to a potential error in the actual connections between devices. Methods for ensuring the accuracy and completeness of the reference information are outside the scope of the present invention; however, such methods are known in the art. It is appreciated that embodiments of the present invention can be extended to the case in which the connections between devices, and hence the connection information, are known to be true and correct, in which case the connection information can be used as the basis for updating the reference information. In other words, there can be instances in which discrepancies between the reference and connection information result in a change to the reference information. Generally speaking, the cabling verification software can be used to synchronize the connection information and the reference information, with one source of information being used to drive a change to the other source of information, depending on which source of information is known to be correct.

FIG. 5 is a data flow diagram 500 for cabling verification elements according to one embodiment of the present invention. Although illustrated and described as separate elements, it is appreciated that any of these elements can be combined and/or integrated with any of the other elements.

In the embodiment of FIG. 5, the elements of the present invention include design (or reference) information 510, connection (or as-built) information 515, cabling verification software 520, and a report 530. As described previously herein, the design information 510 includes a computer-readable version of a network design; specifically, the version of a network that is presumed to be correct and that is presumed to be implemented. The connection information 515 includes computer-readable information that represents the network as it actually is implemented. Cabling verification software 520 receives and compares the design information 510 and the connection information 515 and generates a report 530. The report 530 includes a listing of any discrepancies between the design information 510 and the connection information 515. The report 530 can also list instances of agreement between the design and connection information, and instances in which further investigation may be needed. Furthermore, the report 530 can list specific information that can be used to correct the error; for example, it can list an incorrectly placed cable, the identifiers for the device and port where the cable is currently inserted, and the identifiers of the device and port where the cable should be inserted, thereby enabling a technician to successfully move the cable from the incorrect location to the correct location.

In summary, embodiments of the present invention provide methods and systems that can verify that network devices (e.g., servers and switches) are properly connected physically. By virtue of automated tasks such as those described above, correctness of the cabling can be verified in less time, at less expense, and as often as desired. Each instance of an incorrect or otherwise unsatisfactory cabling can be pinpointed quickly and early. Corrective actions can be readily derived.

As mentioned, the cabling verification software and method thereof can be executed periodically or on demand.

Accordingly, cabling can be checked for correctness even when an intentional change to the cabling has not been made. In other words, embodiments of the invention can be used to automatically discover failures such as, but not limited to: network failures caused by a cable getting cut, pinched, or otherwise damaged; network failures caused by a NIC becoming defective or unable to function; and network failures caused by failure of a cable plug or a cable socket.

Embodiments of the present invention are thus described. While the present invention has been described in particular embodiments, it should be appreciated that the present invention should not be construed as limited by such embodiments, but rather construed according to the following claims.

What is claimed is:

1. A method of verifying that devices in a network are properly connected physically, said method comprising:
   receiving from a device in said network a listing that identifies other devices coupled to said device and that identifies which communication port of said device each of said other devices is coupled to;
   comparing said listing against reference information representing a design of said network;
   identifying discrepancies between said listing and said reference information; and
   generating a report identifying said discrepancies wherein said report comprises information identifying an incorrectly placed network cable, device and port identifiers indicating wherein said incorrectly placed network cable is inserted, and device and port identifiers identifying where said incorrectly placed network cable should be inserted.

2. The method of claim 1 wherein said reference information comprises a map of said network.

3. The method of claim 1 wherein said reference information comprises, for each of said devices in said network, identification of the type of device and a media access control (MAC) address for each respective network interface cards.

4. The method of claim 1 wherein said reference information comprises identification of a source and a destination for a network cable.

5. The method of claim 4 wherein said reference information comprises a socket identifier for a source device coupled to said network cable and a socket identifier for a destination device coupled to said network cable.

6. The method of claim 1 wherein said listing comprises a MAC address table.

7. The method of claim 1 further comprising:
   issuing a command to view said listing.

8. The method of claim 1 wherein said comparing comprises:
   comparing port numbers for said other devices in said listing against port numbers for said other devices in said reference information.

9. The method of claim 1 further comprising:
   generating a report identifying instances in which said reference information and said listing are in agreement.

10. The method of claim 1 further comprising:
    generating a report identifying instances in which connections between devices cannot be verified.

11. The method of claim 1 further comprising:
    sending a signal over a physical connection between devices of said network to verify integrity of said physical connection.

12. The method of claim 1 wherein said devices are selected from the group consisting of switches, routers, computers, load balancers, and firewalls.

13. A computer system comprising:
    a memory unit; and
    a processor coupled to said memory unit, said processor for implementing a method for verifying that devices in a network are properly connected physically, said method comprising:
    processing connection information received from a device, wherein said connection information identifies other devices coupled to said device and also identifies which communication port of said device each of said other devices is coupled to;
    evaluating said connection information against reference information that describes an arrangement of said network;
    identifying differences between said connection information and said reference information; and
    generating a first report identifying said differences wherein said report comprises information identifying an incorrectly placed network cable, device and port identifiers indicating wherein said incorrectly placed network cable is inserted, and device and port identifiers identifying where said incorrectly placed network cable should be inserted.

14. The computer system of claim 13 wherein said reference information comprises a computer-readable version of a map of said network.

15. The computer system of claim 13 wherein said reference information comprises, for each of said devices in said network, identification of the type of device and a media access control (MAC) address for each respective network interface cards.

16. The computer system of claim 13 wherein said reference information comprises a socket identifier for a source device coupled to a network cable and a socket identifier for a target device coupled to said network cable.

17. The computer system of claim 13 wherein said connection information comprises a MAC address table for said device.

18. The computer system of claim 13 wherein said evaluating comprises:
    searching said connection information for a MAC address associated with each of said other devices;
    locating in said connection information a port number associated with a respective MAC address; and
    comparing said port number in said connection information against a respective port number in said reference information.

19. The computer system of claim 13 wherein said method further comprises:
    producing a second report summarizing results of said evaluating.

20. The computer system of claim 13 wherein said method further comprises:
    causing a signal to be sent over a cable connecting devices in said network to verify the physical integrity of said cable.

21. A computer-usable medium having computer-readable program code embodied therein for causing a computer system to perform a method of verifying that devices in a network are properly connected physically, said method comprising:
    accessing first information that describes a configuration of said network including connections between said devices;

accessing second information received from said devices, said second information describing actual connections between said devices;

comparing said first information and said second information; and generating a message when there is a difference between said first information and said second information wherein said message further comprises information identifying an incorrectly placed network cable, device and port identifiers indicating wherein said incorrectly placed network cable is inserted, and device and port identifiers identifying where said incorrectly placed network cable should be inserted.

22. The computer-usable medium of claim 21 wherein said first information is derived from a computer-readable map of said network.

23. The computer-usable medium of claim 21 wherein said first information comprises, for each of said devices in said network, identification of the type of device and a media access control (MAC) address for each respective network interface card.

24. The computer-usable medium of claim 21 wherein said first information comprises a socket identifier for a source device coupled to a network cable and a socket identifier for a destination device coupled to said network cable.

25. The computer-usable medium of claim 21 wherein said second information comprises MAC address tables resident on said devices.

26. The computer-usable medium of claim 21 wherein said computer-readable program code embodied therein causes a computer system to perform said method comprising:

producing a report comprising said message.

27. The computer-usable medium of claim 21 wherein said computer-readable program code embodied therein causes a computer system to perform said method comprising:

causing signals to be sent over cables connecting said devices.

* * * * *